Aug. 3, 1937.  A. F. POOLE  2,088,973
ELECTRIC CLOCK
Filed June 20, 1933  3 Sheets-Sheet 2

INVENTOR.
Arthur F. Poole.

Patented Aug. 3, 1937

2,088,973

UNITED STATES PATENT OFFICE 2,088,973

ELECTRIC CLOCK

Arthur F. Poole, Ithaca, N. Y.; Maryline B. Poole, administratrix of said Arthur F. Poole, deceased, assignor to Maryline B. Poole, Ithaca, N. Y.

Application June 20, 1933, Serial No. 676,619

12 Claims. (Cl. 58—26)

My invention is an electric clock of the class whose hands are controlled by a regulated alternating electric current sent from a power house equipped with current frequency control means similar to those shown in my Patent 1,310,372 of 1919.

One of the objects of my invention is to provide improved means to keep the hands of the clock going during the time of a temporary interruption of current (hereinafter called an "outage").

Another object of my invention is the provision of a synchronous motor run in step with the line current to wind one end of a spring, the other end of the spring is fast to and drives a train of gears to which are the clock hands and a speed regulating device controlling the unwinding of the spring. The motor automatically keeps the spring the proper tension to drive the hands in step with the motor, for if the speed regulating device, which is of a type to run faster with an increase of power, runs below synchronous speed, the spring is wound faster than it runs down, its tension is increased, and the speed regulator in consequence runs faster until a condition of equilibrium is reached when the spring is running down as fast as it is being wound up by the motor. At this point, the speed regulator and the hands geared thereto are running at synchronous speed and keep in step with the current.

Another object of my invention is to so gear the motor to the spring which it winds that the friction of the gearing connecting the motor and spring will prevent the motor from being turned backwards by the spring when the current goes off. When this happens the force of the spring continues to turn the speed regulator, and hands geared thereto, during the outage, until the spring has been unwound of its stored power. So the hands continue to keep time during an outage.

The speed regulator may be an ordinary clock escapement, preferably a cylinder or verge, on account of the self starting characteristics of these escapements as compared with a lever, however from considerations of lack of noise, I prefer to use as a speed regulator the permanent magnet conducting disc mechanism of an integrating watt meter and it is one of the objects of my invention to use this brake disc arrangement for a speed regulator. Owing to the characteristic of the spring having to unwind as fast as it is being wound by the motor, when a condition of equilibrium has been reached, power is put in the spring by the motor as fast as the spring expends power on the speed regulator, therefore said regulator must turn at synchronous speed just as if it were rigidly geared to the motor instead of being connected through a storage spring. This compensates for any variation of temperature affecting the counter torque of the brake disc and therefore its speed under a given tension of the spring. Gearing the motor rigidly to one end of the spring and the speed regulator rigidly to the other, automatically brings about a condition where the speed regulator turns at synchronous speed notwithstanding the storage spring between them.

When an outage occurs the motor stops and the spring unwinds turning the speed regulator and hands geared thereto, since the tension of the spring decreases during the unwinding the speed of the regulator decreases also and unless some compensating means were introduced the hands would lose time. It is one of the objects of my invention to provide a change in the counter torque of the speed regulator so that as the spring is unwound the counter torque is changed to a compensating amount to the end that the speed of the regulator is kept approximately constant.

When the current is resumed after an outage the regulator is turning at approximately synchronous speed under force of the spring which has run down the amount of the outage. Not having been wound during the outage the spring tension is correspondingly reduced. When current is resumed the motor starts, the spring is wound by the motor, but unless the normal gear ratio between the motor and the spring were changed the spring would never reach its original tension since it is being unwound as fast as it is being wound. A further object of my invention is to prevent the just described condition by the provision of a gear shift to change the ratio between the motor and the spring, so that the spring is wound up higher than synchronous speed until it reaches the tension it had at the time of the outage. Coincidentally the counter torque of the speed regulator is changed to correspond to the increased tension of the spring and thus hold the regulator at synchronous speed. The fact of the spring reaching its original tension determines that the motor gear shift shall return to its normal gear ratio to wind the spring at synchronous speed.

A further object of my invention is the provision of a storage device which shall be displaced from its normal position during an outage, and which by the amount of said displacement determines the counter torque of the speed regulating device and also the time the synchronous motor gear shift shall be operative to have the motor wind the spring at super synchronous speed.

Another object of my invention is an electromagnetic control governed by the line current to determine when the above described gear shift shall come into action and also to perform a similar control for the storage device.

Another object of my invention is in a modification in which the speed regulator is a clock escapement instead of a magnetically braked disc, and the force of the driving or storage spring is used as a measure of the length of an outage. Obviously when an outage occurs the tension of the driving spring decreases and the amount of such decrease is a measure of the duration of the outage. When current is resumed it is desirable to restore the spring to its initial tension, and to that end the gear ratio of the motor to the spring is changed as explained above. To determine when the tension of the spring has been restored I use the force of the spring which is being wound. When this tension reaches its initial value, the gear shift for the motor is thrown to its normal position. Thus the storage device is rendered superfluous.

A further modification of my invention is shown in which the gear shift of the motor is replaced by an electrical change which runs the motor at increased speed during a rewinding following an outage. The force of the storage spring is used to determine the speed of the motor. When the spring has been rewound to its initial tension the motor resumes synchronous speed.

A further object of my invention is in the specific mechanisms to carry out the above recited functions. The above and other objects of my invention will be apparent to those skilled in the art as they are set forth in the following specification and claims.

My invention may be best understood with the assistance of the accompanying drawings of which:—

Fig. 12 shows a modification of Fig. 8. Like numbers of reference refer to the same parts in all the figures.

Figure 1:
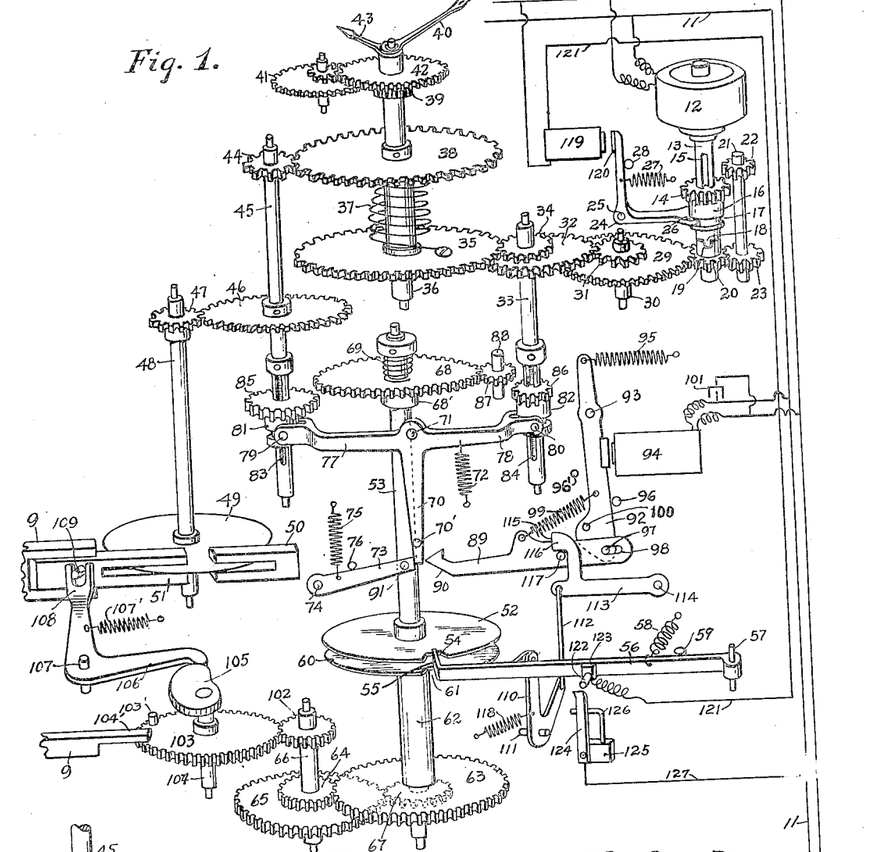
Fig. 1 is a perspective view, more or less diagrammatic, of a clock made according to my invention.
Figure 10:
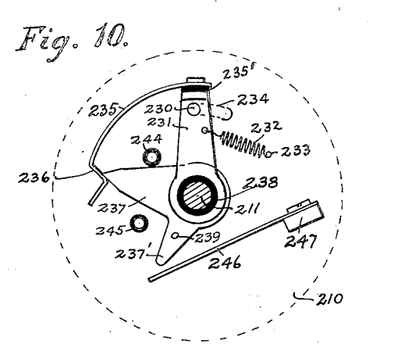
Figs. 10, and 11 are details of Fig. 8, taken on a section through $x$—$x$ in the direction indicated.
Figure 11:
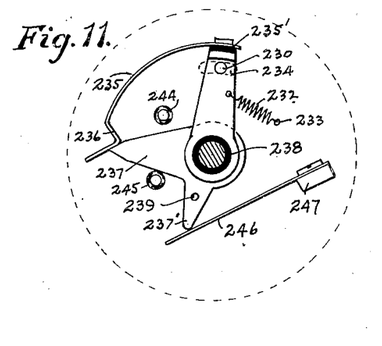

Referring now to Figs. 1, 10 and 11 are line wires supplied with regulated current as in my patent above referred to. A synchronous motor 12 is connected between the line wires 10 and 11 and in step with the line current in the wires 10 and 11. A suitable reducing gearing, not shown, reduces the speed of the motor and turns a shaft 13 on which is slidably mounted a pinion 14 held by a keyway 15 from turning on the shaft 13. A collar 16 rigid with the pinion 14 has a groove 17 and a finger 18 engaging a slot 19 in a pinion 20 loosely mounted on the shaft 13. A jack shaft 21 turns in the frame work and has rigid with it gears 22 and 23, the latter in mesh with the gear 20 and the former adapted to be meshed with the pinion 14 when the pinion is shifted to an upper position by a lever 24 turning on a pivot 25 and having an end 26 engaging the slot 17. A spring 27 holds the lever 24 in a normal position to a stop 28. The arrangements are such that when the lever 24 is in its normal position the gear 20 will turn at the speed of the shaft 13, but when the lever 24 is shifted to its alternative position and motion of the shaft 13 is transmitted to the gear 20 through the jack shaft 21 and its gears 22 and 23, the gear 20 is driven at double the speed in the same direction. The arrangement just described will be recognized as similar to part of the transmission gears of an automobile. The shifting of the lever 24 is done by means to be described later.

Meshing with the gear 20 is a gear 29 mounted on a shaft 30 turning in the frame work. For the purpose of illustration merely and to fix one's ideas by definite figures, we will assume that the gear 29, when the lever 24 is in the position shown, turns once a minute. Mounted on the gear 29 is a pinion 31 which drives a wheel 32 on a shaft 33 turning in the framework. A pinion 34 on said shaft drives a wind wheel 35 rotatably mounted on a center shaft 36. The gear ratio between the wheels 29 and the wind wheel 36 is such that the latter turns once an hour.

A spring 37 is attached to the wheel 35 and has its other end fastened to a drive wheel 38 frictionally mounted on the center shaft 36 on which is the customary cannon pinion 39 and minute hand 40. An intermediate gear 41 is driven by the pinion 39 and drives an hour wheel 42 on which is an hour hand 43. The construction is the usual clock one and will be apparent to those skilled in the art from the drawings.

The drive wheel 38 drives a pinion 44 on a shaft 45 turning in the frame work and on which is rigidly mounted a wheel 46. The gear ratios are such that when the gears 35 and 38 are turning at the same rate the shafts 33 and 45 are turning at the same rate also.

The wheel 46 drives a pinion 47 on a shaft 48 turning in the frame work. The speed regulator is on the shaft 48 and consists of a conducting disc 49 mounted on said shaft and turning in the field of a permanent magnet 50. Eddy currents produced in the disc 49 by the flux of the magnet 50 retard the motion of the disc in the well known manner and produce a counter torque which regulates the motion of the disc 49. For the purpose of adjusting this counter torque I have provided a magnetic shunt 51 adapted to slide in the frame work 9 by means presently to be described, and thus change the magnetic flux through the disc 49 and consequently the counter torque.

As thus far described, the motor 12 drives the wind wheel 35 at a speed of one revolution per hour winding the spring 37 at that rate. Since there is no slip between the spring 37 and the drive wheel 35 on the one hand and the wind wheel 38 on the other the two wheels must sooner or later reach the same rate of speed and the hands 40 and 43 then will be moved as if they were geared directly to the synchronous motor 12. This condition persists so long as the current is on. I will now describe the action of the device in the event of an outage.

When an outage occurs the mechanism—
(a) Keeps track of the length of the outage in a storage device;
(b) Changes the counter torque on the disc 49 to compensate for the running down of the spring 37 so as to keep the disc running at approximately synchronous speed during the outage.

The storage device consists of a disc 52 on a shaft 53 and having a notch 54 into which may enter a feeler 55 on a lever 56 mounted on a shaft 57 turning in the framework and held by a spring 58 to a stop 59 in the framework. The registry of the feeler 55 in the notch 54 determines the normal position of the storage disc 52. To provide additional capacity for the storage device I have provided a second disc 60 having a notch 61 therein and mounted on a sleeve 62 turning loosely on the shaft 53 and having a gear 63 on the lower end thereof. The gear 63 is connected by a reducing gearing to the shaft 53, said gearing consists of a pinion 64 attached to a wheel 65 mounted on a shaft 66 turning in the framework. The wheel 65 is driven by a pinion 67 on the shaft 53. When the notches 54 and 61 are in registry the feeler 55 enters them, otherwise it rides on the circumference of one or the other of the storage discs 52 or 60 which are both of the same diameter.

The shaft 53 is driven by means of a gear 68 frictionally mounted on the shaft 53 and held against a collar 68' on said shaft by a slip spring 69; a gear shift device is adapted to drive the gear 68 either in one direction from the shaft 45 (this condition obtaining when the current is off) or in the other direction from the shaft 33 (this condition obtaining during the time the motor 12 is winding the spring 37 to its original tension after an outage). This gear shift device will now be described.

A T shaped lever 70 is mounted on a shaft 71 in the framework, said shaft being in a plane at right angles to the shaft 53. A spring 72 tends to turn the lever 70 in a clockwise direction but is prevented from so doing by a detent 73 on a pivot 74 and held by a spring 75 to a stop 76. The lever 70 has two yokes 77 and 78 in which are pins 79 and 80 which engage grooves in the sliding collars 81 and 82 which are slidably mounted on the shafts 45 and 33 respectively. A keyway 83 in the shaft 45 prevents the collar 81 from turning in respect to the shaft 45 and a keyway 84 in the shaft 33 has a like function for the collar 82. A gear 85 is on the collar 81 and is adapted to mesh and turn the gear 68 when slid on the shaft 45 into the plane of said gear when the lever 70 is permitted to turn to its extreme right position. Similarly, the collar 82 has a gear 86 thereon which, when thrown into the plane of an idler 87 on a jack shaft 88 turning in the framework, will drive the idler 87 and hence the gear 68 in mesh therewith in the reverse direction from the direction in which the gear 68 will be driven from the gear 85. The gear 85 is twice the diameter of the gear 86 and hence will turn the storage disc 52 twice as fast as the gear 86. The reason for this different ratio will be explained hereinafter.

The normal position of the lever 70 is in the central position shown in Figure 1 where said lever is held on the detent 73. When the current goes off the detent 73 is unlatched by a hook 89 having a cam surface 90 adapted to contact with a pin 91 in the detent 73. The hook 89 is mounted on the end of a lever 92 turning on a pivot 93 in the framework and held by a magnet 94 against the tension of a spring 95 to a stop 96. The magnet 94 is connected to the line wires 10 and 11 and will hold the lever 92 in the position shown in Fig. 1 so long as the line current is on. The lever 92 has a pin 97 which supports the hook 89 in a slot 98 in the right hand end of said hook, a spring 99 between the hook and the lever 92 holds the hook to a pin 100 mounted in the lever 92. The magnet 94 may have a condenser 101 in shunt therewith to prevent chattering from the alternating current, or the lever 92 and its associated parts may be made with moment of inertia large enough to the same end.

Figure 2:
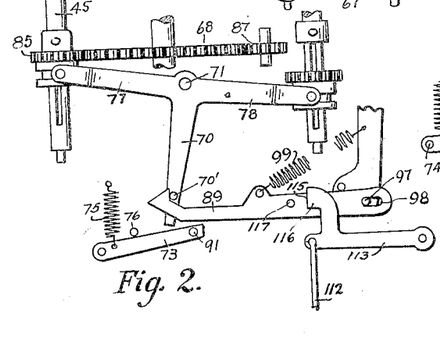
Figs. 2 and 3 are details of certain sections of Fig. 1.

When the current goes off the magnet 94 is de-energized, the spring 95 moves the lever 92 in a clockwise direction to a stop 96', the hook 89 moves to the left and the cam surface 90 trips the detent 73 thus allowing the parts to come into the position shown in Fig. 2. In this position the gear 85 starts to drive the gear 68 and displace the storage discs 52 and 60, the train of gears from the gear 38 to the speed regulator 49 being driven from the power stored in the spring 37. As the spring 37 runs down, the speed regulator would tend to run slower, to compensate for this decrease in tension I have provided a gear 102 on the shaft 66 driving a gear 103 on a shaft 104 turning in the framework and having mounted thereon a cam 105 driving a follower 106, mounted on a shaft 107, against a spring 107'. The follower 106 has a fork 108 therein which, by a pin 109 in the magnetic shunt 51, moves said shunt to change the effect of the permanent magnet 50 on the brake disc 49. The surface of the cam 105 is so shaped to compensate for the decrease in the force of the spring 37 and thus keep the disc 49 revolving at approximately synchronous speed, that is the speed at which it was going when the motor 12 was running. It is not necessary for this compensation to be exact, outages are of comparatively rare occurrence and of short duration, so that if the clock hands depart a little from the right time during an outage it is not material.

Figure 3:
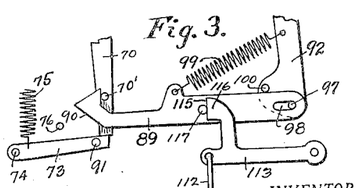

There now remains to be described the cycle of events when the current comes on after an outage. When the current comes on the magnet 94 is made and attracts the lever 92 to the position shown in Fig. 1. At this time the outage has lasted long enough to (a) displace the notches in the storage discs from their normal position, or (b) has been of transient duration, in which event the notches have not been displaced. I shall discuss (b) first. In this event the lever 56 is in the position shown in Fig. 1 and is holding a bell crank 110 mounted on a shaft 111 at right angles to the plane of the shaft 53 in the position shown in said figure. A link 112 extends from the bell crank 110 to a catch 113 pivoted at 114 and having a hook 116 adapted to engage a pin 117 on the hook 89 and a surface 115 adapted to act as a stop for said pin. (See Fig. 3.) Consequently the hook 89 is stopped in the position shown in Fig. 3 with neither of the gears 85 or 86 in mesh and things go on as before the current was broken.

In alternative (a) the current outage has lasted long enough to displace the notches in the storage discs and the lever 56 allows the bell crank 110 to turn under the tension of the spring 118 and raise the surface 115 out of the way of the pin 117. Consequently the gear 86 meshes with the idler 87 and the storage discs 52 and 60 are returned to their normal position. Controlling the gear shift for the motor is a magnet 119 placed to attract an armature on an arm 120 extending from the lever 24 moving the gear shift for the synchronous motor 12. This magnet is connected to the line wire 10 and has a conductor 121 extending to a contact 122 on an insulating stud 123 on the lever 56. The cooperating contact 124 is on an insulating block 125 on the framework and held in position by a stop 126. A conductor 127 connects contact 124 to the line wire 11. Thus when the feeler 55 is riding on the circumference of the discs 52 and 60 the contacts 122 and 124 are closed and the magnet 119 shifts the motor to its double speed position. This winds the spring 37 at twice the normal speed, once to balance the motion of the gear 38, which of course is still running, and once to replace the turns lost during the outage. When the storage discs have been returned to their normal position with the feeler 55 in the notch 54 the lever 56 breaks the contact springs 122 and 124, the magnet 119 is unmade, the gear shift 14 returns to its normal position, and the motor resumes its normal speed connection. Also the spring 58 turns the bell crank 110 against the spring 118, the link 112 pulls the hook downward thereby through the pin 117 releasing the pin 70′ engaged by the hook 89 and permitting the lever 70 to return to the position shown in Fig. 1 dis-engaging the gear 86 from the idler 87. The parts are now in the position shown in Fig. 1, completing the cycle.

The reason for having the gear 86 half the diameter of the gear 85 is that when the storage is brought back to normal by the gear 86, this gear is running at twice the speed at which the storage discs were displaced by the gear 85, consequently to bring the discs back in the same time, corresponding to the double speed of the shaft 33 the gear 86 is of half the diameter of the gear 85. To put the matter in another way, after an outage, to restore the tension of the spring 37 the shaft 33 must make as many turns as made by the shaft 45 during the outage plus the number of turns made by the shaft 45 during the period of rewind. Since the motor shift is as two to one the shaft 33 turns at double speed the length of the rewind. Hence its gear ratio to the storage must be half that of the shaft 45 to the storage.

As before noted, the object of using the regulator in the form of a brake disc is to avoid the noise of a clock escapement. When this noise is not objectionable a clock escapement may be substituted for the brake disc with the advantage of cheapness, since in addition to the saving in the cost of the permanent magnet, one may omit the device of the gear 103, the cam 105, and their associated mechanism since the variation in rate of a clock escapement with varying motive force is much less than that of a brake disc. Further, since the spring 37 is not rewound during an outage, it is possible, to a rough approximation, to use the variation in tension of the spring 37 to measure the time the motor 12 is to be run at increased speed to restore the initial tension of the spring 37. I have shown an alternative structure to that of Fig. 1 in these two respects in Figs. 4, 5, 6, and 7. For the sake of clearness, Figure 4 has been drawn as an exploded view.

Figures 4, 5, 6, 7:
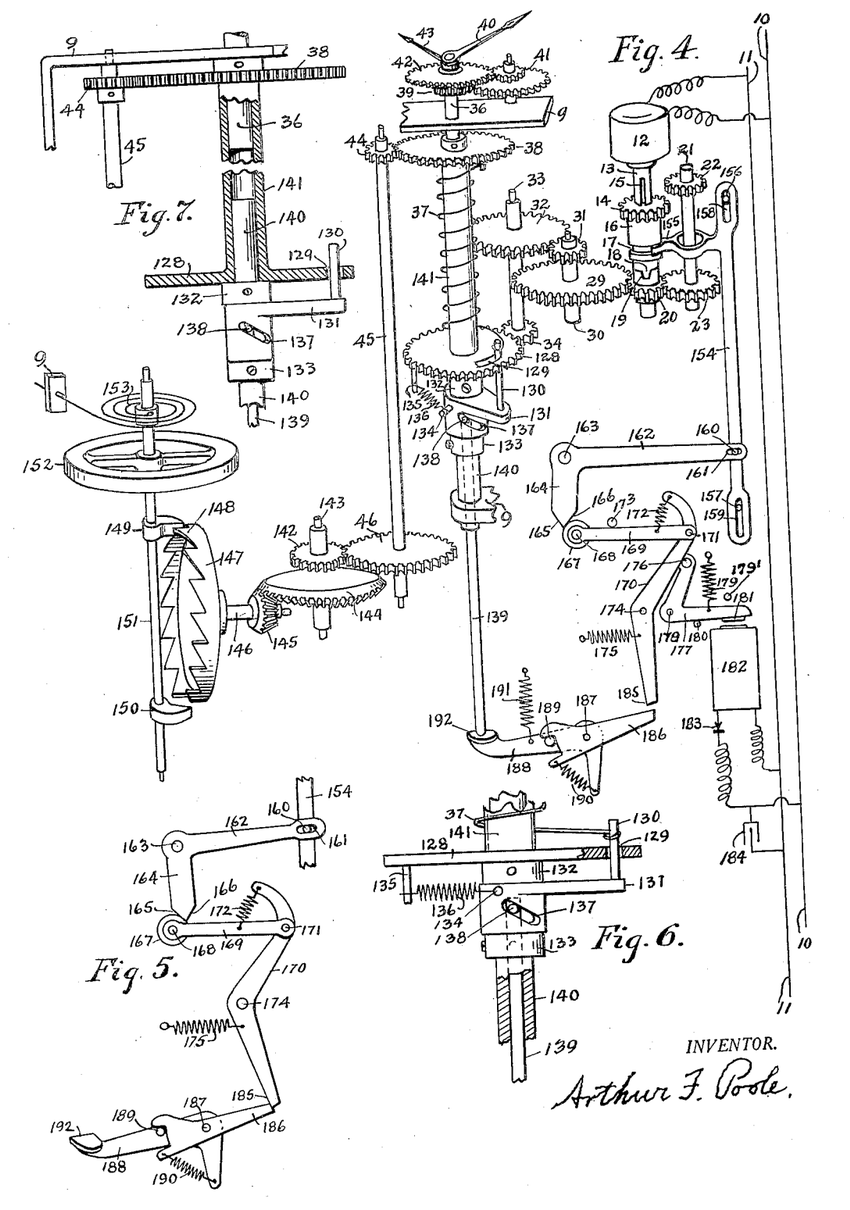
Figure 4 is an exploded view and shows a modification in which the force of the driving spring replaces the storage device of Fig. 1.
Figs. 5, 6, and 7 are details of Fig. 4.

Referring now to these figures, a brief description will be all that is necessary to those skilled in the art on account of the resemblance of the alternative structure to that of Fig. 1. As before a synchronous motor 12 is connected to the mains 10 and 11 and is provided with a gear shift similar to that of Fig. 1. Through a train of gears 29, 31, 32, and 34 described before, the motor 12 turns a gear 128 once an hour when the motor 12 runs at synchronous speed. Wound by the gear 128 is a spring 37 driving clock hands 40 and 43 and a train of gears as in the structure shown in Fig. 1. However in the present structure, the gear 46 turns a gear 142 on a shaft 143 turning in the framework. A bevel gear 144 on the shaft 143 turns a bevel 145 on a shaft 146 which carries a scape wheel 147 having crown teeth 148. These teeth alternately engage and drive verge arms 149 and 150 on a shaft 151 of a balance 152 which vibrates under the influence of a spring 153 fastened at one end to the shaft 151 and having the other end attached to the framework 9.

I have used a verge escapement rather than a lever escapement on account of the fact that the verge will start as soon as force is applied to it. It is also more sensitive to variations in motive force, a desirable characteristic in its present use. When the current is on, a condition of equilibrium is soon reached between the wheels 128 driven by the motor 12 and the wheel 38 driven by the spring 37, and the wheel 38 will turn as if it were directly geared to the motor 12 and ran in step therewith.

I shall now describe the means for measuring the tension of the spring 37 and controlling the gear shift for the motor 12 therefrom. Referring to Figs. 4, 6, and 7, the spring 37 is not fastened directly to the gear 128 but is fastened to a pin 130 in an arm 131 turning on the staff 140 which has an upper bearing in a sleeve 141 rigid to the shaft 140 and holds the arm 131 between collars 132 and 133, said collars being also fast to the shaft 140. The wheel 128 has a slot 129 therein, the ends of which limit the rotary motion of the pin 130 which may be held to one edge of said slot by a spring 136 extending from a pin 134 in the arm 131 to a pin 135 in the wheel 128. The pin 130 may be drawn to the other edge of said slot 129 by the spring 37 fastened to said pin. In the normal running of the clock the spring 37 is stronger than the spring 136. However when the current goes off, the spring 37 runs down and loses its tension, whereupon the spring 136 rotates the arm 131 on the shaft 140 until stopped by contact of the pin 130 with the edge of the slot 129. The shaft 140 has a hole therein in which slides a push rod 139 having a small right angled pin 138 thereon which is guided in an angular slot 137 in the arm 131. From this results a raising and lowering of the push rod 139 as the pin 130 goes from one end of the slot 129 to the other in response to the pull of the spring 37 or the spring 136 whichever is the stronger.

As so far described, we have the condition that when the clock is running under the force of the motor and the spring 37 has its normal tension the push rod 139 is in its upper position, when the current goes off, the spring 37 runs down, the spring 136 prevails and rotates the arm 131 in a clockwise direction. The pin 138 is then cammed to its lower position by the slot 136 and the push rod 139 is carried to its lower position also. I will now describe the mechanism by which the motion of the push rod 139 controls the position of the gear shift for the motor 12.

Referring particularly to Fig. 4 there is a fork 155 on a shift rod 154, said rod sliding on pins 156 and 157 in the framework and being guided by two slots 158 and 159. The fork 155 engages a slot 17 in the collar 16 and serves to shift the pinion 14 which, as pointed out in the description of Fig. 1, determines whether the gear 20 shall revolve at synchronous speed or at double that speed. In order to shift the rod 154 there is a pin 160 in said rod adapted to be acted on by a slot 161 in a lever 162 turning on a pivot 163 in the framework. The lever 162 has an arm 164 having inclined surfaces 165 and 166 acted on by a roller 167 turning on a pin 168 in a link 169 which is mounted on a lever 170 on a pivot 171. A spring 172 between the lever 169 and the lever 170 tends to turn the lever 169 in a clockwise direction thereby holding the lever 162 in one or the other of its alternative positions as determined by contact of the roller 167 with one or the other of the surfaces 165 or 166. A pin 173 in the framework 9 limits the upward motion of the lever 169.

The lever 170 turns on a pivot 174 in the framework and is held by a spring 175 to a pin 176 in an armature lever 177 turning on a pivot 178 in the framework. A spring 179 tends to rotate the lever 177 in a counterclockwise direction to a stop 179' but is prevented from so doing during the time current is on by the attraction of a magnet 182 connected to the line wires 10 and 11 through a current rectifier 183. A condenser 184 in shunt around the magnet 182 prevents chattering. The magnet 182 attracts an armature 181 on the lever 177 and holds said lever to a stop 180. When the current goes off the spring 179 pulls the lever 177 to the stop 179', the pin 176 rotates the lever 170 in a counterclockwise direction, the roller 167 rides over the apex of the angle formed by the surfaces 165 and 166, the lever 162 is thereupon rotated counter-clockwise by the roller 167 and the shift rod 154 throws the gear shift 16 to its double speed position. At this time the motor 12 is stopped since there is no current. However things are all set to have the motor wind the spring 37 at double the synchronous speed when current is resumed. At this point in the cycle, the parts just described are in the position shown in Fig. 5.

When current is resumed, the lever 177 is drawn to the magnet 182. At this stage the spring 37 has lost some of its tension and the push rod 139 is in its lower position holding a detent 186 in a position to engage an arm 185 on the lever 170 thereby preventing the lever 170 from following the pin 176 when the lever 177 is drawn up on resumption of the current. The detent 186 turns on a shaft 187 pivoted in the framework, this shaft also carries a lever 188 having a pin 189 therein engaging a fork in the rear end of the detent 186 which also is drawn by a spring 190 to the pin 189. The lever 188 is drawn by a spring 191 so that an ear 192 on the lever 188 contacts with the push rod 139.

When current is resumed after an outage, the lever 170 is held from following the lever 170 and the gear shift is held in its double speed position until the spring 37 has been restored to approximately its initial tension at which time the push rod is cammed to its upper position by the arm 131 rotating in relation to the gear 128. The spring 191 then unlocks the detent 186 and permits the lever 170 to return to its normal position under the force of the spring 175. The roller 167 will then be moved to the surface 166 and the gear shift will be thrown to the position shown in Fig. 4. This completes the cycle.

It is to be noted that the motor 12 is connected to the lines 10 and 11 between the power house and the rectifier 183. Said rectifier is of use only to prevent chattering of the magnet 182. The same end may be obtained by omitting the rectifier 183 and the condenser 184 and making the lever 177 of large moment of inertia.

It is also to be noted that the gear train leading from the motor 12 to the wheel 35 in Fig. 1, or 128 in Fig. 4, is to be irreversible, that is, the spring must not be able to drive this train backwards. This purpose may be accomplished by putting a one-way ratchet some place in the train.

Figure 8:
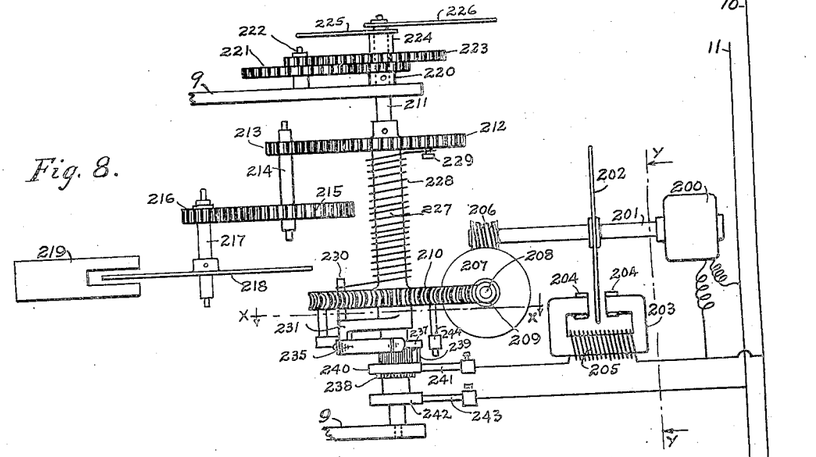
Fig. 8 is a view in elevation of a modification in which an electrical device is used for changing the speed of the synchronous motor during a period of rewind after an outage, this replacing the mechanical gear shift of Figs. 1 and 4.
Figure 9:
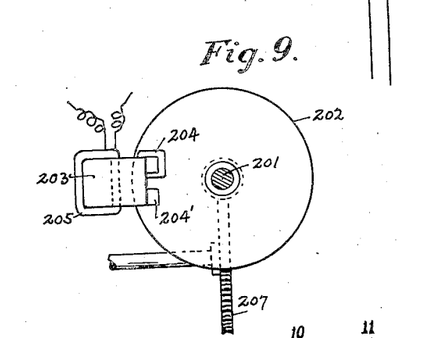
Figure 9 is a section taken on Fig. 8 through $y$—$y$ in the direction indicated.

I have shown a further modification of my invention in Fig. 8 with details in Figs. 9, 10, and 11. In this form I have replaced the gear shift and mechanism for moving the same by an electrical connection in the motor to run it above synchronous speed, and have used the force of the driving spring to determine when this change of speed shall take place. Referring to the above mentioned figures, 200 is a self starting synchronous motor connected to the line wires 10 and 11. On the motor shaft 201 is a conducting disc 202 which runs between the poles of an electromagnet 203 having shaded poles 204 and a winding 205 adapted to be energized by the line current on the wires 10 and 11 as afterwards to be described. The disc 202 and its associated magnet 203 form an induction motor and are given a torque greater than the synchronous torque of the motor 200 so that when the winding 205 is energized the shaft 201 will be driven at about two or three times synchronous speed. The exact ratio, as will afterwards appear, is not material.

The motor 200 winds a spring by means of a worm 206 on the shaft 201 driving a wheel 207 on the axis 208 of which is a second worm 209 driving a wheel 210 turning on a shaft 211 on which is frictionally mounted (to allow the hands to be set) a wheel 212 driving a pinion 213 on a shaft 214 on which is a wheel 215 driving a pinion 216 on a shaft 217. The shaft 217 carries a speed regulator which I have shown as a conducting disc 218 revolving in the field of a permanent magnet 219. A clock escapement may be used as a speed regulator instead of the disc if the noise is not objectionable.

Figure 12:
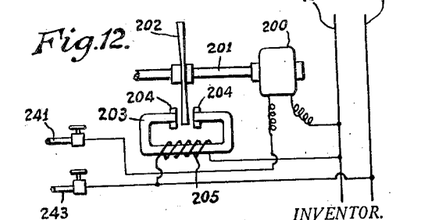

For the purposes of clearness in the description I have shown the induction motor 202 as separated from the synchronous motor 200. As a matter of practice, these two motors would be combined in one structure having the winding 205 acting on the armature so as to give an increased torque which would overcome the synchronous torque and thus run the armature above synchronous speed. An obvious variation of the plan shown in Fig. 8 would be to have the torque of the induction motor less than the torque of the synchronous motor, as shown in Figure 12, then when it is wished to have the motor run above synchronous speed the winding of the synchronous motor could be opened, thus throwing this motor out of action. The armature would then speed up above synchronous speed due to the unopposed torque of the induction motor. I consider this latter modification within the scope of my invention.

The shaft 211 carries a cannon pinion 220 driving an intermediate gear 221 having a pinion attached thereto turning on a stud 222. The pinion attached to the wheel 221 drives the hour wheel 223 on a sleeve 224 turning on the shaft 211. The minute hand 226 is carried on the shaft 211 and the hour hand 225 on the sleeve 224. Rigid with the wheel 210 is a sleeve or hub 227 turning freely on the shaft 211 and around this hub is a driving spring 228 fastened at the one end to a stud 229 on the wheel 212 and at the other end to a pin 230 in an arm 231 loose on the shaft 211. Thus the tension of the spring 288 will tend to rotate the arm 231 in a counterclockwise direction (Fig. 10). A spring 232 extends from the arm 231 to a stud 233 in the wheel 210 and tends to rotate the arm 231 in a clockwise direction in opposition to the spring 228. Therefore the arm 231 will be in the position shown in Fig. 10 when 228 is the stronger and in the position shown in Fig. 11 when the spring 232 is stronger. The movement of the arm 231 is delimited by the pin 230 and a slot 234 in the wheel 210.

I use the motion of the arm 231 to govern the circuit of the coil 205 by means of a snap cam 237 actuated by a spring 235 carried by, and insulated from the arm 231 by an insulating piece 235'. A hump 236 on the spring 235 co-operates with the cam 237 mounted on an insulating collar 238 which turns on the shaft 211 freely. The collar 238 has also mounted on it a slip ring 240 connected by a wire 239 to the cam 237. Insulated banking posts 244 and 245 in the wheel 210 serve to limit the angular motion of the cam 237 under the force of the spring 235. It is evident that as the arm 231 is moved from one position to another under the force of either the spring 227 of the spring 233 the cam 237 will be snapped from the position shown in Fig. 10 to that shown in Fig. 11. I use this motion of the cam 237 for closing the circuit of the coil 205 of the spring 227 or the spring 233 the cam 237 will which contacts with a spring 246 mounted on a block 247 on the wheel 210 and hence grounded on the framework. A slip ring 242 is driven on the shaft 211 and has the double function of providing a lower bearing for the insulating collar 238 and of also taking current from a brush 243 connected to the line wire 11. A brush 241 contacting with the slip ring 240 is connected to the coil 205 which in turn is connected to the line wire 10. Therefore the coil circuit is open between the spring 246 and the cam 237. When the cam is thrown to the position shown in Fig. 11, which position corresponds to a decreased tension of the spring 228, the coil 205 is closed and the motor 202 runs the motor 200 above synchronous speed. This condition persists until the tension of the spring 228 has been restored when the arm 231 is pulled by the tension of the spring 228 against the tension of the spring 232 to the position shown in Fig. 10 at which time the cam 237 is snapped to a position opening the circuit of the induction motor 202. The motor 200 then runs at synchronous speed, completing the cycle.

I prefer to make the spring 227 of a large number of turns (the same applies to the springs 37 of Figs. 1 and 4) so as to have a small variation of the force of said springs in the event of an outage. It is to be borne in mind that outages are of comparatively rare occurrence, and that they are usually short, so that if the clock should get a few minutes from the correct time during an outage it is no fatal matter, it is only a comparative one between a clock having one error and a clock having a larger one. The structure shown in Fig. 1 will give the least error due to an outage, that shown in Fig. 4 will give a greater one, and the structure shown in Fig. 8 is the least accurate of all. In each case one pays for accuracy by a more complicated structure.

To illustrate, suppose the spring 228 has 20 turns and, during an outage, unwinds one turn per hour. At the end of an hour it has lost five per cent of its force and the disc 218 is running five per cent slow. The total time lost at the end of an hour is then approximately 2½ per cent of 60 minutes or one and one-half minutes, an amount perfectly satisfactory for the ordinary household clock. Further, the clock may be furnished with some kind of an outage indicator—the red indicator on the Telechron clocks shown in a certain patent to Warren will do very well—and the clock owner has notice to set his clock after an outage if he desires more accurate time.

In the following claims I have used the word "fastened" as descriptive of the attachment of the driving spring. I wish this construed as meaning fastened without slip to distinguish from the prior art in which there is some kind of slip connection, such as a frictionally attached spring (for example in the patent to Poole, 1,328,247 of 1920), a device to throw the wind out of action when the spring has reached a certain tension, etc. I believe I am the first to show a non slip connection at both ends of the driving spring to the end that the clock hands are compelled to follow the synchronous motor during the time the motor is running at synchronism, the spring providing a storage to run the clock during an outage.

Many changes and modifications may be made in the precise structure herein shown without departing from the spirit of my invention since I claim:—

1. In an electric clock adapted to operate from a source of alternating current of regulated frequency, the combination of a synchronous motor run from said current, a spring, a set of gears whereby said motor is enabled to wind said spring at a predetermined rate, a second set of gears whereby said motor is enabled to wind said spring at a predetermined rate which differs in magnitude from said first mentioned rate, means responsive to the tension of said spring, and a gear shift device actuated by said tension responsive means for engaging said first set of gears and disengaging said second set of gears when the tension of said spring changes a predetermined amount.

2. In an electric clock adapted to operate on a source on alternating current of regulated frequency, timekeeping means, a spring for driving said timekeeping means, a synchronous motor capable of being operated at supersynchronous speed, and means responsive to the tension of said spring for operating said motor at said supersynchronous speed.

3. In an electric clock adapted to operate on a source of alternating current of regulated frequency, a spring, timekeeping mechanism driven by and adapted to be rate-responsive to the tension of said spring, a synchronous motor connected to said source of alternating current for winding said spring, whereby said spring is normally maintained at a substantially constant tension, means capable of being selectively displaced by the unwinding of said spring and replaced by the winding of said spring, selectively acting means for causing said displacement means to be displaced by the unwinding of said spring during an interruption in said source of current and for causing said displacement means to be replaced during the resumption of current following said interruption, and means responsive jointly to the displacement of said displacement means and the resumption of current for causing said spring to be wound at an accelerated rate.

4. In an electric clock adapted to operate on a source of alternating current of regulated frequency, a spring, a timing mechanism of the type in which the rate increases with an increase in tension of the driving spring and conversely, said timing mechanism being driven by said spring, a synchronous motor connected to said source of current, for winding said spring at a normal predetermined rate, whereby the average rate of said timing mechanism will bear an exact ratio, numerically, to the frequency of said alternating current, and means responsive to the duration of an interruption in said current for causing said motor to wind said spring at an accelerated rate for a length of time proportional to the length of said interruption, whereby the rate of winding of said spring over the period of an interruption and the period immediately subsequent thereto is approximately equal to the normal predetermined winding rate.

5. In an electric clock adapted to be operated on a source of alternating current of regulated frequency, a synchronous motor run from said current, a variable ratio gear train operated from said motor, a spring fastened to said gear train, a second gear train, a speed regulator to govern the speed of said second train, said spring being attached to and driving said second gear train, means to change the ratio of said first mentioned gear train, and means operated by the tension of said spring to determine which gear ratio of said first gear train shall be effective for causing said motor to wind said spring.

6. In an electric timing mechanism adapted to be operated by a commercial alternating current timed frequency power system, a spring, an escapement mechanism driven by said spring of the type in which the rate increases with an increase in tension of said spring and conversely, said escapement being constructed so that its average rate bears the correct relation to the frequency of said alternating current for timekeeping purposes when said spring is wound to a predetermined tension, a motor unit capable of operating at a normal synchronous speed or at a higher, non-synchronous speed connected to said power system and adapted to wind, when running at said synchronous speed, said spring at a rate which is just equal to the rate of release of said spring when said spring is wound to said predetermined tension and, when running at said non-synchronous speed at a second rate which is greater than said first rate, said motor comprising a coil, a flux transmitting member, and a rotor and means responsive to the tension of said spring for altering the flux in said flux transmitting member, whereby the motor speed is determined.

7. In an electric clock adapted to operate from an alternating current supply, the combination of a synchronous motor, a circuit connecting said motor to the supply, an induction motor having a torque greater than that of said synchronous motor, a circuit connecting said induction motor to said supply, a spring, means actuated by said motors to wind said spring, and a contact device operated by the tension of said spring for controlling one of said circuits.

8. In an electric clock adapted to operate from an alternating current supply, the combination of a synchronous motor, a circuit connecting said motor to the supply, an induction motor having a torque less than that of said synchronous motor, a circuit connecting said induction motor to the supply, a spring, means actuated by said motors to wind said spring, and a contact device operated by the tension of said spring for controlling first named circuits.

9. In an electric clock adapted to operate on a source of alternating current of regulated frequency, the combination of a spring, timekeeping mechanism driven by said spring and adapted to be rate responsive to the tension of said spring, time indicating means under the control of said timekeeping mechanism, a synchronous motor connected to said source of alternating current for winding said spring, whereby said spring is normally maintained at substantially constant tension, auxiliary means responsive to an interruption in said source of current for causing said motor to wind said spring at an accelerated rate upon resumption of said current, and means associated with said timekeeping mechanism for adjusting the rate thereof during an interruption of said source of current, whereby said substantially constant spring tension is reattained before said time indicating means can show an appreciable loss of time.

10. In an electric clock adapted to operate from a supply of alternating current of regulated frequency, a spring, a winding means operated by said alternating current for normally winding said spring at a rate which bears a fixed ratio to the frequency of said alternating current, means for increasing said winding rate, means responsive to the length of an interruption in said source of current for actuating said rate increasing means for a period proportional to the length of said interruption, whereby the average rate of winding of said spring constant over a period of time, whether an interruption occurs during the period or not, and an escapement of the type in which the rate increases as the tension of the driving spring increases, and conversely, said escapement being driven by said spring, whereby a point will be reached at which the spring unwinds at the same speed that it is wound by the winding means to thereby drive the escapement at an average speed bearing the correct relation to the frequency of the alternating current for timekeeping purposes.

11. In an electric clock adapted to operate on a source of alternating current subject to occasional interruptions, a synchronous motor run from said current, a spring, a winding device connecting said motor and said spring whereby said motor may wind said spring at either of two rates, said lower rate bearing a fixed ratio to the frequency of said current, means capable of being displaced in an amount proportional to the length of an interruption of said current, means brought into action by said displaceable means to determine at which of said two rates said spring shall be wound, and an escapement of the type in which the rate increases as the tension of the driving spring increases, and conversely, said escapement being driven by said spring, whereby a point will be reached at which the spring unwinds at the same speed that it is wound by the synchronous motor to thereby drive the escapement at an average speed bearing the correct relation to the frequency of the alternating current for time-keeping purposes.

12. In an electric clock adapted to operate on a source of alternating current of commercial frequency, an escapement mechanism, a spring to drive said escapement, said escapement being of the type in which the rate increases when the tension of the driving spring increases and being designed to have a rate which bears an exact predetermined relation to the frequency of said source of current when the spring is wound to a certain predetermined tension, a motor mechanism connected to said source of alternating current and adapted to wind said spring, said motor comprising a field combination and a rotor, said field combination being so adapted that two forces are brought to bear on said rotor by said field combination, a synchronous force which tends to make the rotor run at a predetermined synchronous speed, and an induction force which tends to make the rotor run at a speed greater than said synchronous speed, and means responsive to the tension of said spring for controlling said field, whereby if said tension is less than said predetermined tension by a predetermined amount said induction force will predominate and said rotor run at a greater than synchronous speed.

ARTHUR F. POOLE.